United States Patent [19]

Hill et al.

[11] 4,232,368
[45] Nov. 4, 1980

[54] INTERNAL COMBUSTION ENGINE FUNCTION CONTROL SYSTEM

[75] Inventors: William F. Hill, Stafford; John P. Southgate, Georgeham, Nr. Braunton, both of England

[73] Assignee: Lucas Industries Limited, Birmingham, England

[21] Appl. No.: 940,697

[22] Filed: Sep. 8, 1978

[30] Foreign Application Priority Data

Sep. 16, 1977 [GB] United Kingdom ............... 38694/77

[51] Int. Cl.² .......................... G06F 15/20; F02P 5/04
[52] U.S. Cl. ................................... 364/431; 123/416; 123/487; 364/569
[58] Field of Search ............... 364/431, 442, 424, 569; 123/32 AE, 32 EA, 32 EB, 32 EC, 117 D, 148 E, 146.5 A

[56] References Cited

U.S. PATENT DOCUMENTS

| | | | |
|---|---|---|---|
| 3,986,006 | 10/1976 | Kawai et al. | 364/431 |
| 4,036,190 | 7/1977 | Bigliani et al. | 364/431 X |
| 4,060,714 | 11/1977 | Lappington et al. | 364/431 |
| 4,092,717 | 5/1978 | Di Nunzio | 364/431 |
| 4,119,069 | 10/1978 | Perrin | 364/431 X |
| 4,128,885 | 12/1978 | Valek et al. | 364/431 X |

Primary Examiner—Joseph F. Ruggiero
Attorney, Agent, or Firm—Ladas & Parry

[57] ABSTRACT

An internal combustion engine function control system, for example a spark ignition control system, comprising first and second pulse generating means driven by the engine. The first pulse generating means produces a train of pulses at a first frequency equal to the frequency of the required function and the second pulse generating means produces a train of pulses at a second frequency which is a multiple of the first frequency. Engine parameter sensitive means are provided for varying the phase of the second pulse train relative to that of the first pulse train between limits such that the combined ordinal succession of the pulses is maintained constant. The system further includes function timing means for causing triggering of an output circuit at the end of a delay following a pulse from said first pulse generating means. This delay consists of the sum of a first delay to one of the pulses produced by the second pulse generating means and a second delay, the first and second delays being determined by the frequency and phase of the two pulse trains.

10 Claims, 6 Drawing Figures

4,232,368

INTERNAL COMBUSTION ENGINE FUNCTION CONTROL SYSTEM

This invention relates to an internal combustion engine function control system which is applicable to the control both of ignition timing and fuel injection.

Many known ignition timing and fuel injection control systems employ complex transducer for converting various engine parameters into electrical signals—either analogue signals, digital signals, or variable frequency signals. The performance and reliability of these transducers are open to some doubt and it is one object of the present invention to provide a system which uses a simple transducer arrangement.

A system in accordance with the invention comprises first and second signal generating means mechanically driven by the engine, said first signal generating means producing a train of signals at a first frequency equal to the required function frequency, and the second signal generating means producing a train of signals at a second frequency which is a multiple of the first frequency, engine parameter sensitive means for varying the phase of the first signal train relative to that of the second signal train between limits such that the combined ordinal succession of the signals is maintained constant, and function timing means for causing triggering of an output circuit at the end of a delay following a signal from said first signal generating means, such delay consisting of the sum of a first delay to one of the signals produced by the second signal generating means and a second delay, the first and second delays being determined by the frequency and phase relationship of the two signal trains.

With such a system, the engine parameter sensitive means is required merely to change the phase relationship between two signals trains. The signal generating means can thus quite simply consist of an engine driven rotor, a fixed stator and a stator which is angularly movable relative to the fixed stator by mechanical means sensitive to the engine parameter in question, the rotor and the stators having interacting signal producing means such as magnet/pickup or light source/receiver combinations.

Preferably, the two signal trains are employed to generate two multi-bit digital signals representing engine speed and another engine parameter respectively. The timing means then preferably includes an empirically programmed read-only digital memory addressed by said two multi-bit digital signals and producing a multi-bit digital output, which is employed (a) to determine which of the pulses of the second pulse train terminates said first delay and (b) the duration of the second delay.

When the control system is a spark ignition system said output circuit includes a spark circuit which is triggered into operation by said function timing means. In this case the engine parameter sensitive means for varying the relative phase of the signal generating means comprises an engine load transducer such as a manifold vacuum transducer.

Where the spark ignition system is of the known kind including an inductor in which energy is stored whilst current is flowing therein and released when a spark is required by interrupting such current, the read only memory output signal may also determine the instant of commencement of the current.

Where the control system is a fuel injection system the output circuit is used to control one or more fuel injection valves which is or are switched on by each of the first signals and switched off again at the end of the delay. In this case a further delay period may be introduced utilizing a monostable circuit giving an output duration dependent on battery voltage to correct for the opening and closing delays of the valves.

The engine parameter used in this case to vary the relative phase of the two signal trains may be air intake airflow as measured, for example by a spring-loaded flap in the air intake.

The present invention will now be described in more detail, by way of example, with reference to the accompanying drawings in which.

Figure 1:
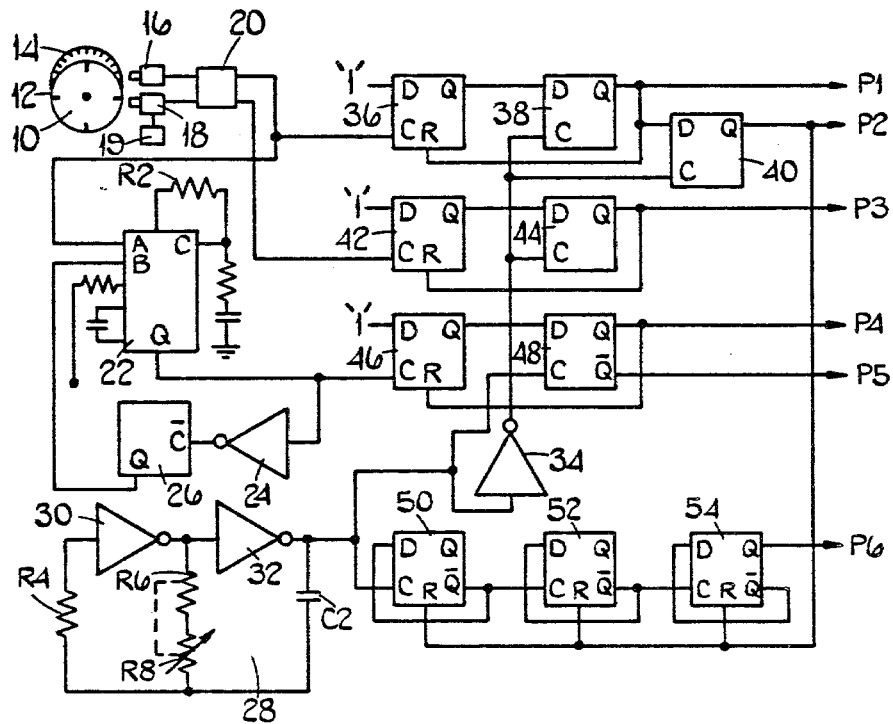
FIG. 1 is a circuit diagram of the signal generating section of a spark ignition control system embodying the present invention.

Referring now to FIG. 1 there is shown the signal generating section of the system. This section includes a transducer assembly comprising a rotor 10 driven by the engine, the ignition of which is to be controlled. The rotor 10 has two sets of teeth 12 and 14, the set 12 having four teeth and the set 14 having thirty two teeth. Two variable—reluctance pick-ups 16 and 18 are associated with the respective sets of teeth 12, 14, the pick-up 16 being fixed to the casing of the transducer assembly and the pick-up 18 being angularly movable about the rotor axis by an engine parameter sensitive means in the form of a manifold vacuum transducer 19. The pick-ups 16, 18 are connected to the input of a pulse shaper 20 to produce two trains of rectangular profile pulses. It should be noted that the range of angular movement of the pick-up 18 is limited so as to ensure that the combined ordinal succession of the pulses is constant whatever the position of the pick-up 18. It is also to be noted that, although the pick-up 16 is fixed, in use, its position may be adjusted.

Figure 2:
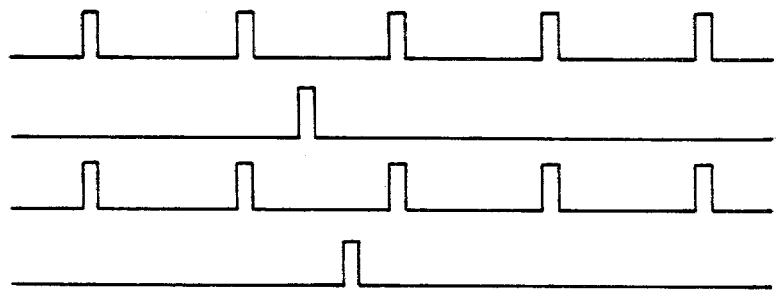
FIG. 2 shows waveforms of the signals generated in the section shown in FIG. 1.

In FIG. 2, the first two lines show one example of the output pulses of the pulse shaper 20 and the second two lines show the pulses after movement of the pick-up 18.

The output of the pulse shaper 20 associated with the pick-up 16 is connected to the input terminal (A) of the self bias circuit of a phase locked loop circuit 22. The phase locked loop circuit (PLL) 22 comprises a Motorola 14046 phase locked loop. The output of one of the phase comparators of the PLL 22 is connected through a resistor R2 to the input terminal (C) of the voltage controlled oscillator of the PLL 22. The output terminal (Q) of the voltage controlled oscillator is connected to the input terminal of an inverter 24, the output terminal of which is connected to the $\overline{\text{CLOCK}}$ input terminal ($\overline{C}$) of a divide by 32 counter 26. The output terminal (Q) of the counter 32 is connected to the input terminal (B) of the phase comparators of the PLL 22. External resistors and capacitors are also connected to PLL as shown. The PLL 22 functions to produce pulses at the output terminal (Q) of the voltage controlled oscillator which are synchronized with, but at a frequency 32 times greater than the pulses produced at the output terminal of the shaper 20 associated with the pick-up.

The section shown in FIG. 1 further includes a clock pulse generator, generally indicated at 28, which comprises an inverter 30, the output of which is connected to the input of an inverter 32. The output of the inverter 32 is connected through a capacitor C2 and a resistor R4, connected in series, to the input of inverter 30. The output of inverter 30 is also connected through a fixed resistor R6 and a variable resistor R8 to the junction of capacitor C2 and resistor R4. The clock pulses are produced at the output terminal of the inverter 32. The output of inverter 32 is also connected to the input of an inverter 34 to provide inverter clock pulses at the output thereof.

The output terminal of the pulse shaper 20 associated with the pick-up 16 is connected to the C-input terminal of a C-D flip-flop 36, the D-input terminal of which is set to a logic "1". The Q-output terminal of flip-flop 36 is connected to the D-input terminal of a C-D flip-flop 38, the C-input terminal of which is supplied with inverted clock pulses and the Q-output terminal of which is connected to the R-input terminal of flip-flop 36. Consequently a train of pulses P1 are produced at the Q-output terminal of flip-flop 38, these pulses being triggered by the pulses delivered to the C-input terminal of flip-flop 36, synchronized to the negative going edge of the clock pulses and having a duration equal to the period of the clock pulses.

The Q-output terminal of flip-flop 38 is connected to the D-input terminal of a C-D flip-flop 40, the C-input terminal of which is supplied with inverted clock pulses. Consequently, a train of pulses P2 is produced at the Q-output terminal of flip-flop 40, these pulses following the pulses P1 by one clock pulse period.

The output terminal of the pulse shaper 20 associated with the pick-up 18 is connected to the C-input terminal of a C-D flip-flop 42, the D-input terminal of which is set to a logic "1". The Q-output terminal of flip-flop 42 is connected to the D-input terminal of a C-D flip-flop 44, the C-input terminal of which is supplied with inverted clock pulses and the Q-output terminal of which is connected to the R-input terminal of flip-flop 42. Consequently, a train of pulses P3 are produced at the Q-output terminal of flip-flop 44, these pulses being triggered by the pulses delivered to the C-input terminal of flip-flop 42, synchronized to the negative going edge of the clock pulses, and having a duration equal to the period of the clock pulses.

The output terminal (Q) of the voltage controlled oscillator of the PLL 22 is connected to the C-input terminal of a C-D flip-flop 46, the D-input terminal of which is set to a logic "1". The Q-output terminal of the flip-flop 46 is connected to the D-input terminal of a C-D flip-flop 48, the C-input terminal of which is supplied with clock pulses and the Q-output terminal of which is connected to the R-input terminal of flip-flop 46. Consequently, a train of pulses P4 are produced at the Q-output terminal of flip-flop 48, these pulses being triggered by the output pulses of the voltage controlled oscillator, synchronized to the positive edges of the clock pulses, and having a duration equal to the period of the clock pulses. A train of pulses P5 are produced at the $\overline{Q}$-output terminal of flip-flop 48.

The clock pulses are also supplied to the C-input terminal of a C-D flip-flop 50, the $\overline{Q}$-output terminal of which is connected to its D-input terminal and also to the C-input terminal of a C-D flip-flop 52. The $\overline{Q}$-output terminal of flip-flop 52 is connected to its D-input terminal and also to the C-input terminal of a C-D flip-flop 54. The $\overline{Q}$-output terminal of flip-flop 54 is connected to its D-input terminal. The pulses P2 are supplied to the R-input terminals of flip-flops 50, 52, 54. Consequently a train of pulses P6 is produced at the Q-output terminal of flip-flop 54 which are synchronized by the pulses P2 and which have a frequency one eighth that of the clock pulses.

Figure 3:
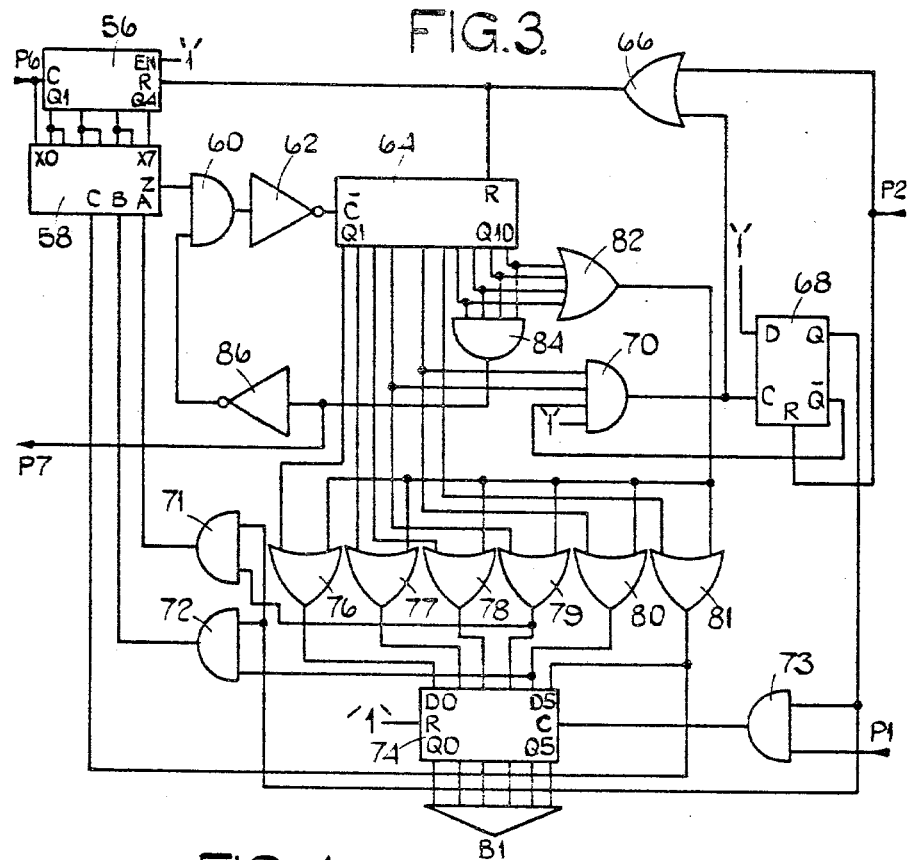
FIG. 3 is a circuit diagram of the section of the control system which generates a multi-bit signal representing engine speed.

Referring now to FIG. 3, there is shown the section of the control which produces a multi-bit binary signal representing the speed of the engine. In this section, the pulse train P6 is connected to the clock input terminal (C) of a counter 56 and also to the X0-input terminal of a data selector 58.

The counter 56 comprises one half of a Motorola MC14520 dual-up counter and the selector 58 comprises a Motorola MC 14512 8 channel data selector. The Q1 output terminal of counter 56 is connected to the X1 and X2 input terminals of selector 58, the Q2 output terminal to the X3 and X4 input terminals, the Q3 output terminal to the X5 and X6 input terminals, and the Q4 output terminal to the X7 input terminal. The ENABLE terminal (EN) of counter 56 is set to a logic "1".

The Z output terminal of selector 58 is connected to one input terminal of an AND-gate 60, the output of which is connected to the input terminal of an inverter 62. The output terminal of inverter 62 is connected to the $\overline{\text{CLOCK}}$ input terminal ($\overline{c}$) of a counter 64. The counter 64 comprises a Motorola MC14040 12-bit binary counter.

The pulse train P2 is supplied to one input terminal of an OR-gate 66, the output terminal of which is connected to the RESET terminals (R) of counters 56 and 64. The pulse train P2 is also supplied to the R-input terminal of a C-D flip-flop 68. The D-input terminal of flip-flop 68 is set to a logical "1" and the $\overline{Q}$-output terminal is connected to one input terminal of a four input AND-gate 70. The Q-output terminal of flip-flop 68 is connected to one input terminal of each one of AND-gates 71 and 72 and also to one input of an AND-gate 73, the other input of which is supplied with the pulse train P1. The output terminal of AND-gate 73 is connected to the CLOCK input terminal of a latch 74. Latch 74 comprises a Motorola MC14174 hex type D flip-flop.

The Q1 to Q6 output terminals of counter 64 are connected respectively to one of the input terminals of OR-gates 76 to 81, the output terminals of which are connected respectively to the input terminals D0 to D5 of latch 74. The Q4 and Q5 output terminals of counter 64 are also connected respectively to two inputs of AND-gate 70, the remaining input of which is set to a logic "1". The output of AND-gate 70 is connected to the other input of OR-gate 66 and also to the C-input terminal of flip-flop 68. The output of OR-gate 79 is connected to the other input of AND-gate 71, the output of which is connected to the A-control terminal of selector 58. The output of OR-gate 80 is connected to the other input of AND-gate 72, the output of which is connected to the B-control terminal of selector 58. The output of OR-gate 81 is also connected to the C-control terminal of selector 58. The outputs Q7 to Q10 of counter 64 are connected to the four inputs of a four input OR-gate 82 and to the four inputs of a four input AND-gate 84. The output of OR-gate 82 is connected to the other inputs of OR-gates 76 to 81. The output of AND-gate 84 is connected to the input of an inverter 86, the output of which is connected to the other input of AND-gate 60. The output of AND-gate 84 also supplies a signal P7, as will be described below, for de-energising the primary winding of the coil of the ignition system.

The R-input terminal of latch 74 is set to a logic "1" and the Q0 to Q5 output terminals of latch 74 provide a 6-bit binary output B1.

In operation, when a pulse P2 is received, counters 56 and 64 are reset and flip-flop 68 is also reset. The control inputs A, B and C of selector 58 will all be at a logic "0" and so counter 64 will be incremented at the rate of the pulse train P6. When counter 64 reaches a count of 24, counters 56 and 64 will be reset and flip-flop 68 will be set thereby enabling AND-gates 71, 72 and 73. The data at the input terminals of latch 74 cannot be latched by a pulse P1 until the flip-flop 68 is set thereby preventing false data from being latched during the initial count of 24, for example during overspeed conditions. As the AND-gates 71 and 72 are now enabled, counter 64 will count the pulse P6 in a quasi-logarithmic fashion and this will continue until a count of 63 is reached. At this stage the output of all the OR-gates 72 to 81 are set at "1" and the selector 58 supplies pulses to counter 64 at the lowest rate, i.e., 1/16 the rate of pulse train P6. Counter 64 will then continue counting until it reaches the binary number 1111000000, at which stage AND-gate 84 will inhibit the counting action of counter 64 and a pulse P7 will be produced to de-energise the ignition coil.

If at any stage during the counting, a pulse P1 is received, the data at the input terminals of latch 74 will be latched to provide a 6-bit binary number B1 at the output terminals. Following the pulse P1, a pulse P2 will be received and the counting cycle will be repeated.

The number B1 is representative of the engine speed and, during normal operating conditions, a number B1 will be produced for each pulse P1. The pulse P7 will normally only be produced when the engine is stationary.

Figure 4:
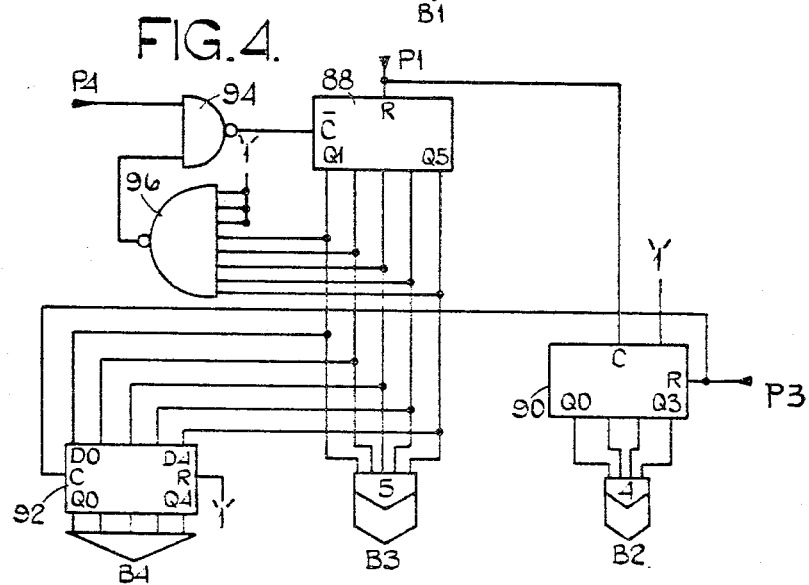
FIG. 4 is a circuit diagram of the section of the control system which generates multi-bit signals representing engine intake manifold pressure and crankshaft position.

Referring now to FIG. 4 there is shown the section of the system which produces a binary number representative of the vacuum in the engine inlet manifold, and consequently of the engine load, and also a further two binary numbers representative of the crankshaft position.

In this system, pulses P1 are supplied to the RESET input terminal (R) of a counter 88 and to the CLOCK terminal (C) of a counter 90. The counter 88 comprises a Motorola MC14024 seven stage ripple counter and the counter 90 comprises one half of a Motorola MC14520 dual-up counter. The pulses P3 are supplied to the RESET terminal (R) of counter 90 and also to the C-input terminal of a latch 92. Latch 92 comprises a Motorola MC14174 hex type D flip-flop. The pulses P4 are supplied to one input of a NAND-gate 94, the output of which is connected to the $\overline{\text{CLOCK}}$ terminal $(\overline{C})$ of counter 88. The output terminals Q1 to Q5 of counter 88 are connected to five of the inputs of an eight input NAND-gate 94, the other three inputs of which are set to a logic "1" and the output of which is connected to the other input of NAND-gate 94. The output terminals Q1 to Q5 of counter 88 are also connected to inputs D0 to D4 of latch 92, the R-input terminal of which is set to a logic "1".

In operation the counter 90 counts the pulses P1, which are associated with the pick-up 16, to produce a 4-bit binary number B2, and the counter 88 counts the pulses P4, which are associated with the PLL 22, to produce a 5-bit binary number B3. The binary numbers B2 and B3 together represent the crankshaft position to a resolution of 1/32 of the angular spacing of the teeth 12. The count of counter 88 is also latched in latch 92 by each pulse P3, which is associated with pick-up 18, to produce a binary number B4 representative of the position of pick-up 18 relative to the position of pick-up 16, and consequently of the vacuum in the inlet manifold. The counter 88 is prevented from overcounting by NAND-gate 96.

Figure 5:
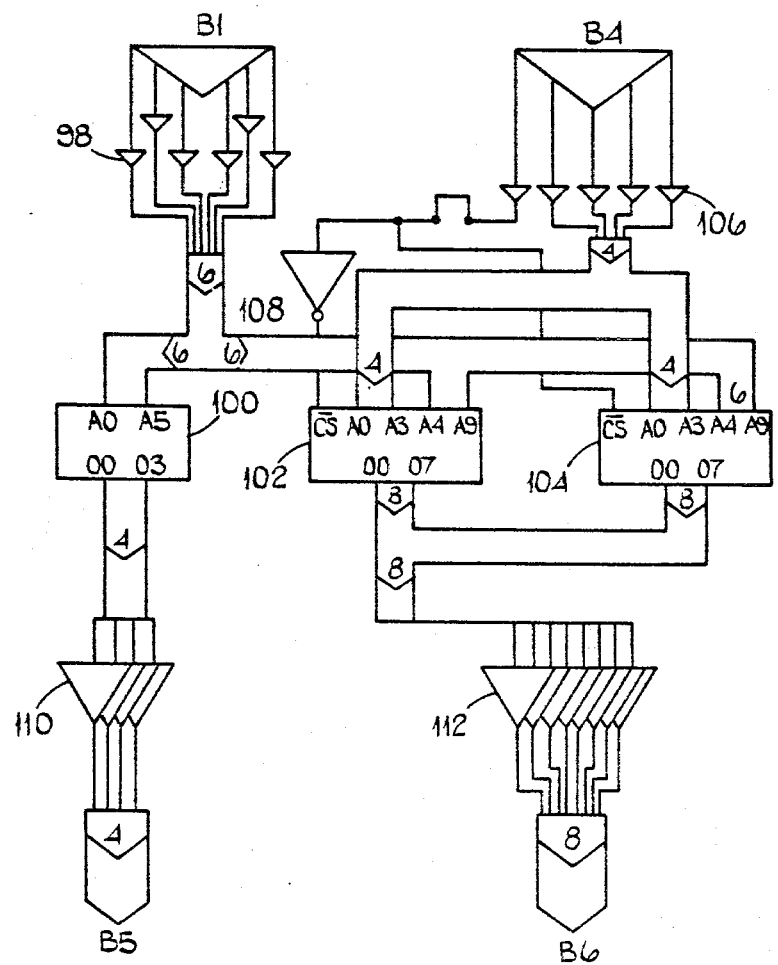
FIG. 5 is a circuit diagram of the section of the control system which generates multi-bit signals representing the crankshaft positions at which the ignition coil should be energised and de-energised.

Referring now to FIG. 5 there is shown the section of the system which uses the binary numbers B1 and B4, which are representative respectively of the engine speed and manifold vacuum, to produce two further binary numbers which indicate the crankshaft positions at which the coil is to be energised and de-energised to produce an ignition spark. In this section, the binary number B1 is supplied through a set of buffers 98 to the address inputs A0 to A5 of a read-only-memory 100, to the address inputs A4 to A9 of a read-only-memory 102, and to the address inputs A4 to A9 of a read-only-memory 104. The memory 100 comprises an Intel 2704 read-only-memory, and the memories 102 and 104 each comprise a Intel 2708 read-only-memory. The four most significant bits of the number B4 are supplied through a set of buffers 106 to the address inputs A0 to A3 of memory 102 and also to the address inputs A0 to A3 of memory 104. The least significant bit of the number B4 is supplied to the input of one of the buffers 106. The output of this buffer is connected to the input of an inverter 108, the output of which is connected to the CHIP SELECT terminal $(\overline{CS})$ of memory 102, and also directly to the CHIP SELECT terminal $(\overline{CS})$ of memory 104.

The memories 100, 102 and 104 are empirically programmed with ignition timing data. The data output terminals 00 to 05 of memory 100 provide through a set of buffers 110 a four bit binary number B5 representative of the crankshaft position at which the ignition coil is to be energised. The memories 102 and 104 provide through a set of buffers 112 an eight bit binary number B6 representative of the crankshaft position at which the coil is to be de-energised to produce a spark.

In an alternative embodiment only one of the memories 102 and 104 is required, the least significant bit of the number B4 not being used.

Figure 6:
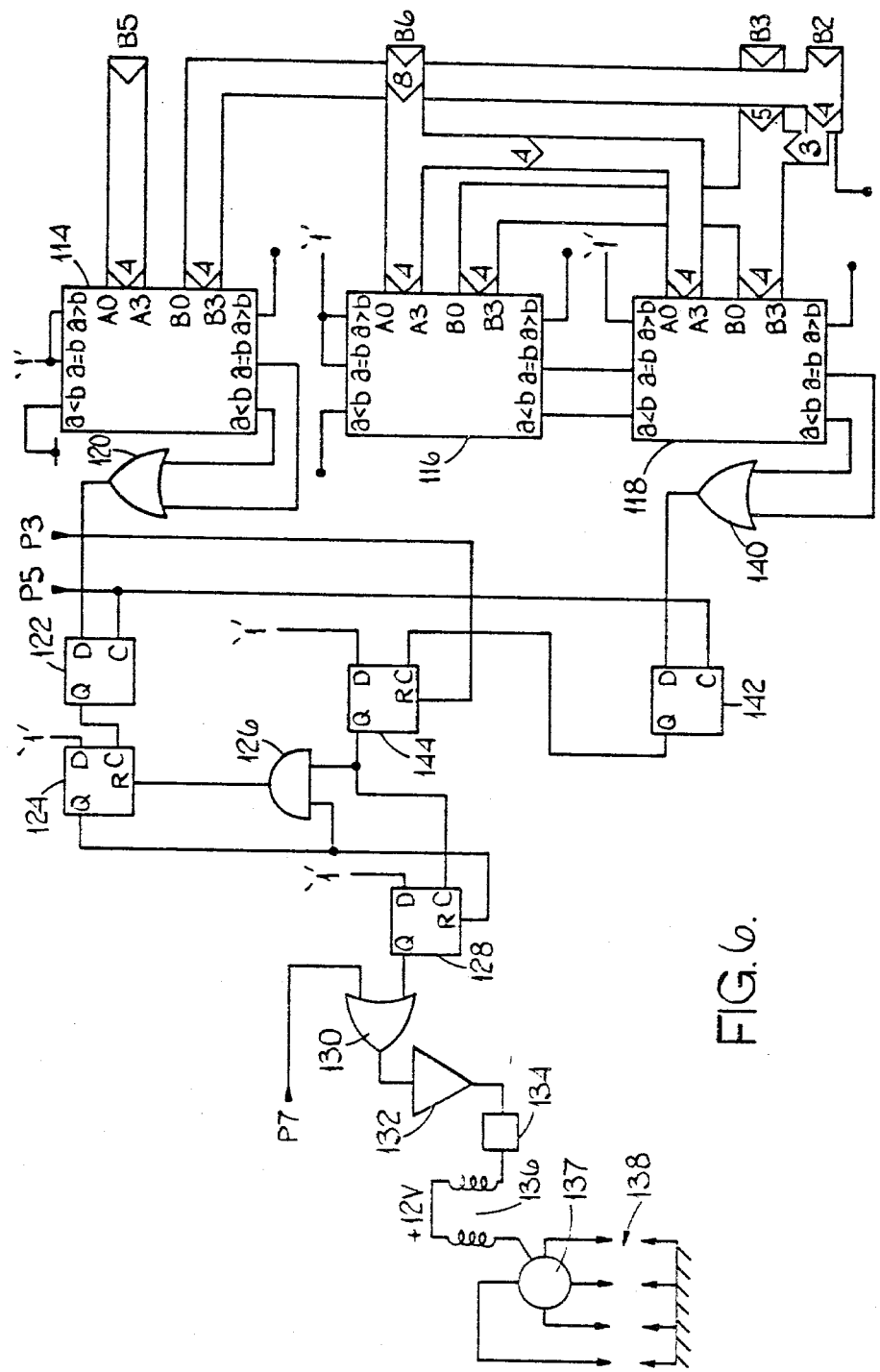
FIG. 6 is a circuit diagram of the section of the control system which produces the signal for controlling current flow in the coil.

Referring now to FIG. 6, there is shown the section of the system which compares the numbers B2 and B3, which represent the crankshaft position, with the numbers B5 and B6, which represent the crankshaft position at which the ignition coil is to be energised and de-energised, in order to control the coil. This section includes three comparators 114, 116 and 118, each of which comprises a Motorola MC14585 4-bit magnitude comparator.

In this section the binary number B5 is connected to the A0 to A3 comparing inputs of comparator 114. The four most significant bits of the number B6 are connected to the A0 to A3 comparing inputs of comparator 118 and the four least significant bits are connected to the A0 to A3 comparing inputs of the comparator 116. The four bits of the number B2 are supplied to B0 to B3 comparing inputs of comparator 114. The three least significant bits of number B2 are supplied to the B1 to B3 comparing inputs of comparator 118 and the most significant bit of number B3 is supplied to the B0 comparing input of comparator 118. The four least significant bits of the number B3 are supplied to the B0 to B3 comparing inputs of the comparator 116.

The A=B and the A>B cascading inputs of the comparator 114 are connected to a logic "1". The A<B and the A=B outputs are connected to the two inputs of an OR-gate 120, the output of which is connected to the D-input of a C-D flip-flop 122.

The C-input of the flip-flop 122 is connected to the pulse train P5 and the Q-output is connected to the C-input of a C-D flip-flop 124, the D-input of which is connected to a logic "1". The Q-output of flip-flop 124 is connected to one of the inputs of an AND-gate 126 and to the R-input of a C-D flip-flop 128. The Q-output of flip-flop 128 is connected to one input of an OR-gate 130, the output of which is connected to a buffer 132. The output of buffer 132 is connected to the input of an ignition controller 134, the output of which control the primary of the ignition coil 136. The arrangement is such that the primary is energised when a logic "0" is present at the input of controller 134 and de-energised when the input is a logic "1". The secondary winding is connected to the input of a distributor 137, the four outputs of which are connected to four spark plugs 138.

The A=B and the A>B cascading inputs of comparator 116 are connected to a logic "1". The A<B and the A=B outputs of the comparator 116 are connected to the A<B and the A=B cascading inputs of comparator 118. The A<B and the A=B outputs of comparator 118 are connected to the two inputs of an OR-gate 140, the output of which is connected to the D-input of a C-D flip-flop 142. The C-input of flip-flop 142 is connected to the pulse train P5. The Q-output of flip-flop 142 is connected to the C-input of a C-D flip-flop 144, the D-input of which is connected to a logic "1". The R-input of flip-flop 144 is connected to the pulse train P3. The Q-output of flip-flop 144 is connected to the other input of AND-gate 126 and to the C-input of flip-flop 128, the D-input of which is connected to a logic "1". The other input of OR-gate 130 is connected to the pulses P7. The output of AND-gate 126 is connected to the R-input of flip-flop 124.

In operation, with the coil 136 energised, when a logic "1" is produced at the A<B or the A=B output of comparator 118, a logic "1" will be delivered to the D-input of C-D flip-flop 142. Then, on receiving the next positive going pulse from the pulse train P5, flip-flop 142 will be set, thereby setting flip-flop 144, enabling AND-gate 126, setting flip-flop 128, and consequently de-energising coil 136 to produce a spark at the respective sparking plug 138. Subsequently, when a logic "1" is produced at the A<B or the A=B output of comparator 114, a logic "1" is delivered to the D-input of flip-flop 122. Then, on receiving the next positive going pulse from pulse train P5, flip-flop 122 will be set thereby setting flip-flop 124, re-setting flip-flops 124 and 128 and consequently energising the coil 136. Subsequently, when a pulse P3 is produced, the flip-flop 144 will be reset and the cycle can then be repeated. By using the pulses P3 to reset flip-flop 144, the possibility of double sparking is avoided.

If the ignition system is switched on when the engine is stationary, a pulse P7 will be produced by AND-gate 84, which pulse will be delivered to OR-gate 130 thereby de-energising the coil 136 and preventing overheating.

It is to be appreciated that as the latches 74 and 92 are controlled by negative going clock pulses whilst the flip-flops 142 and 122 are controlled by positive going clock pulses, errors which might otherwise occur during transition states of memories 100, 102 and 104 are avoided.

It is also to be appreciated that the comparator 118 determines the first part of the delay period and the comparator 116 determines the second part of the delay period between pulse shaper 20 generating a pulse associated with the pick-up 18 and the generation of a spark.

The invention may also be applied to other aspects of internal combustion engine function control, such as to timing of fuel injection in diesel engines and the metering of fuel in both diesel and petrol engines. In the latter case it is desired to modulate the duration of opening of one or more fuel valves through which fuel is admitted to the air intake of the engine. Instead of the pick-up 18 being angularly movable by a load sensing device it is moved by an airflow sensing device such as a known sensing device consisting of a spring-loaded pivoted flap in the air intake arranged to ensure that the signal trains from the pick-ups 16, 18 are in phase at zero air flow.

Each valve is energised open at the start of the delay period mentioned above and, at the end of the delay period determined by the comparators 116 and 118, a further delay component is introduced utilizing a monostable circuit with a reset time dependent on the vehicle battery voltage. This monostable delay component is intended to compensate for the system delays which are introduced when the valve is opened and closed and which are battery-voltage dependent.

Although variable reluctance pick-ups 16, 18, are referred to above, the transducer assembly may use various other forms of sensor which may be electromagnetic or photo-electric. Furthermore, although the example of the invention described is realized in digital circuitry part or all of the circuit may be analogue.

We claim:

1. An internal combustion engine function control system comprising first and second signal generating means mechanically driven by the engine, said first signal generating means producing a train of signals at a first frequency equal to the required function frequency, and the second signal generating means producing a train of signals at a second frequency which is a multiple of the first frequency, engine parameter sensitive means for varying the phase of the first signal train relative to that of the second signal train between limits such that the combined ordinal succession of the signals is maintained constant, and function timing means for causing triggering of an output circuit at the end of a delay following the generation of a signal from said first signal generating means, such delay consisting of the sum of a first delay equal to the period between the generation of said signal from said first signal generating means and the generation of a selected one of said train of signals produced by said second signal generating means and a second delay, the first and second delays being determined by the frequency and phase relationship of the two signal trains.

2. A system as claimed in claim 1 in which the signal generating means consists of an engine driven rotor, a fixed stator and a stator which is angularly movable relative to the fixed stator by mechanical means sensitive to the engine parameter, the rotor and stators having interacting signal producing means.

3. A system as claimed in claim 1 or claim 2 in which the two signal trains are employed to generate two multi-bit digital signals representing engine speed and another engine parameter respectively.

4. A system as claimed in claim 3 in which the timing means includes a read-only digital memory addressed by said two multi-bit digital signals and producing a multi-bit digital output, which is employed (a) to determine which of the signals of the second signal train terminates the first delay and (b) the duration of the second delay.

5. A system as claimed in claim 1 in which the control system is a spark ignition system and said output circuit includes a spark circuit which is triggered into operation by said function timing means.

6. A system as claimed in claim 5 in which the engine parameter sensitive means for varying the relative phase of the signal generating means comprises an engine load transducer.

7. A system as claimed in claim 5 or claim 6 including an inductor in which energy is stored whilst current is flowing therein and released when a spark is required by interrupting such current and in which the read only memory also determines the instant of commencement of the current.

8. A system as claimed in claim 1 or claim 2 in which the control system is a fuel injection system and in which the output circuit is used to control one or more fuel injection valves which is or are switched on by each of the first signals and switched off again at the end of the delay.

9. A system as claimed in claim 8 in which a further delay period is introduced utilizing a monostable circuit giving an output duration dependent on battery voltage to correct for the opening and closing delays of the valves.

10. A system as claimed in claim 8 in which the engine parameter used to vary the relative phase of the two signal trains is air intake airflow.

* * * * *